US008655729B2

United States Patent
Manku

(10) Patent No.: US 8,655,729 B2
(45) Date of Patent: Feb. 18, 2014

(54) USING A FIRST NETWORK TO CONTROL ACCESS TO A SECOND NETWORK

(75) Inventor: Tajinder Manku, Waterloo (CA)

(73) Assignee: Pravala Inc., Kitchener, ON (CA)

( * ) Notice: Subject to any disclaimer, the term of this patent is extended or adjusted under 35 U.S.C. 154(b) by 46 days.

(21) Appl. No.: 12/902,828

(22) Filed: Oct. 12, 2010

(65) Prior Publication Data

US 2012/0022968 A1    Jan. 26, 2012

Related U.S. Application Data

(60) Provisional application No. 61/250,195, filed on Oct. 9, 2009.

(51) Int. Cl.
*G06Q 99/00* (2006.01)
(52) U.S. Cl.
USPC .......................................... 705/14.64; 705/50
(58) Field of Classification Search
USPC ................................................ 705/14.64, 50
See application file for complete search history.

(56) References Cited

U.S. PATENT DOCUMENTS

| | | | | |
|---|---|---|---|---|
| 6,097,942 | A * | 8/2000 | Laiho ........................... | 455/414.1 |
| 6,885,859 | B2 * | 4/2005 | Karaoguz et al. .............. | 455/408 |
| 7,284,062 | B2 * | 10/2007 | Krantz et al. .................. | 709/229 |
| 8,090,401 | B2 * | 1/2012 | Soto ............................ | 455/553.1 |
| 8,091,116 | B2 * | 1/2012 | Kutt et al. ........................... | 726/2 |
| 8,191,124 | B2 * | 5/2012 | Wynn et al. ........................ | 726/6 |
| 2004/0111520 | A1 * | 6/2004 | Krantz et al. .................. | 709/229 |
| 2005/0154895 | A1 * | 7/2005 | Zhang ........................... | 713/182 |
| 2005/0177515 | A1 | 8/2005 | Kalavade et al. | |
| 2006/0052113 | A1 * | 3/2006 | Ophir et al. ................. | 455/456.1 |
| 2006/0236105 | A1 * | 10/2006 | Brok et al. .................... | 713/169 |
| 2007/0268858 | A1 * | 11/2007 | Soto ............................... | 370/328 |
| 2008/0060066 | A1 * | 3/2008 | Wynn et al. ....................... | 726/6 |
| 2009/0109941 | A1 * | 4/2009 | Carter ........................... | 370/338 |
| 2009/0217048 | A1 * | 8/2009 | Smith ........................... | 713/176 |

FOREIGN PATENT DOCUMENTS

| | | |
|---|---|---|
| CA | 2571255 | 6/2007 |
| EP | 1871065 | 12/2007 |
| WO | WO 2006/087616 | 8/2006 |

OTHER PUBLICATIONS

International Search Report—PCT/CA2010/001611.

* cited by examiner

*Primary Examiner* — James D Nigh
(74) *Attorney, Agent, or Firm* — Jonathan Pollack

(57) ABSTRACT

A wireless communication device is configured to be able to communicate via both a first access point and a second access point for using the first access point to obtain validation credentials in order to permit use of the second access point to access a network. The wireless communication device comprises a processor; and a non-transitory computer readable medium having stored thereon computer executable instructions. The instructions are operable to: initiate communication with the second access point in order to access a network; obtain an access point identifier from the second access point, the access point identifier for identifying the second access point; transmit the access point identifier to a validation server via the first access point; receive validation credentials from the validation server via the first access point; and use the validation credentials to validate the wireless communication device with the second access point to obtain access to the network.

21 Claims, 3 Drawing Sheets

USING A FIRST NETWORK TO CONTROL ACCESS TO A SECOND NETWORK

The present invention relates generally to a system and method for obtaining access to a network and specifically to the use of a first network to obtain validation credentials to a second network. This application claims priority from U.S. Provisional Application No. 61/250,195 filed Oct. 9, 2009 and PCT International Application No.: PCT/CA2010/001611, filed on Oct. 8, 2010.

BACKGROUND

The proliferation of the Internet, portable communication devices and wireless networks has lead to the widespread use of communication devices capable of transmitting data as well as voice signals over the air. Most of the communication devices being manufactured provide at least two different wireless technologies to transmit the data; Wireless Wide Area Network (WWAN) technology and Wireless Local Area Network (WLAN) technology.

An example of a WWAN is cellular technology. Initially cellular service providers provided different data packet radio technology depending on the infrastructure they had already established. For example, cellular service providers running on a Code Division Multiple Access (CDMA) infrastructure introduced Evolution-Data Optimized (EV-DO) to provide data packet transfer. Cellular providers running on a Global System for Mobile Communications (GSM) infrastructure introduced General Packet Radio Service (GPRS) to provide data packet transfer. Currently, the GSM and CDMA infrastructures are running 3G standards. However, as the technology evolves, it appears as if most cellular service providers are moving towards the fourth generation of radio technologies, referred to as Long Term Evolution (LTE). It is expected the cellular technologies will continue to advance and evolve. However, cellular technology is still in its relative infancy and access to bandwidth is still relatively expensive and slow.

An example of a WLAN is Wi-Fi, which was developed by the Wi-Fi Alliance. Wi-Fi allows local area networks (LANs) to be deployed without wires for client devices, typically reducing the costs of network deployment and expansion. Spaces where cables cannot be run, such as outdoor areas and historical buildings, can host WLANs. Therefore, portable devices such as notebook computers, video game consoles, mobile phones and personal digital assistants can connect to the Internet when within range of a WLAN connected to the Internet. Using Wi-Fi typically provides relatively inexpensive access to bandwidth. However, Wi-Fi networks have limited range.

Accordingly, a business model has developed providing "hotspots" to allow a user with a Wi-Fi enabled device to access the Internet. Specifically, a hotspot is a site that offers Internet access over a WLAN through the use of a router connected to an Internet service provider. Hotspots typically use Wi-Fi technology to provide the wireless network.

The hotspot may be offered as a value added service by a business or may be used as a dedicated source of revenue. For example, hotspot service providers like Boingo, T-Mobile, Bell, Rogers, AT&T, iPASS, and the like offer a collection of hotspots across a region. If a subscriber subscribes to a hotspot provider's access program, the customer is provided with an account and corresponding validation credentials. The validation credentials are typically a user name and password. To access the Internet, when the subscriber is at the hotspot, the subscriber launches a web browser, such as Internet Explorer for example. The web browser attempts to access the Internet via the Wi-Fi access point at the hot spot. However, software operating on the Wi-Fi access point intercepts the attempt and prompts the user to enter the validation credentials. If the validation credentials are accepted, the user is given access to the network.

However, such a system may require the customers to search out specific hotspots to which they subscribe, which may be inconvenient.

Further, such a system may require that the customers subscribe to multiple hotspot providers to ensure that they have sufficient hotspot coverage, which can be wasteful and expensive.

Yet further, it is difficult to share validation credentials. Businesses that that employ tens, hundreds or even thousands of employees may only need a few hotspot accounts, since only a few employees will need to access a hotspot and any given time. With the present system, it is difficult to manage the accounts and control who is able to access the hotspots at any given time.

Accordingly, it is an objective of the present invention to obviate or mitigate at least some of the above-mentioned disadvantages.

SUMMARY

In accordance with an aspect of the present invention there is provided wireless communication device configured to be able to communicate using both a first access point and a second access point for using the first access point to obtain validation credentials in order to permit use of the second access point to access a network, the wireless communication device comprising: a processor; and a non-transitory computer readable medium having stored thereon computer executable instructions for execution by the processor, the computer executable instructions operable to: initiate communication with the second access point in order to access a network; obtain an access point identifier from the second access point; transmit the access point identifier to a validation server via the first access point; receiving validation credentials from the validation server via the first access point; and use the validation credentials to validate the wireless communication device with the second access point to obtain access to the network.

In accordance with a further aspect of the present invention, there is provided a validation server configured to provide validation credentials to a mobile communication device configured to be able to communicate with a network via both a first access point and a second access point, the validation server comprising: a processor; and a non-transitory computer readable medium having stored thereon computer executable instructions for execution by the processor, the computer executable instructions operable to: receive a request from the mobile communication device via the first access point, the request including an access-point identifier for identifying the second access point and subscriber information for identifying a subscriber; retrieve validation credentials from a database and; transmit the validation credentials to the wireless communication device via the first access point for use by the mobile communication device for connecting to the network via the second access point.

BRIEF DESCRIPTION OF THE DRAWINGS

Embodiments of the present invention will now be described by way of example only with reference to the following drawings in which.

DETAILED DESCRIPTION OF THE PREFERRED EMBODIMENTS

Figure 1:
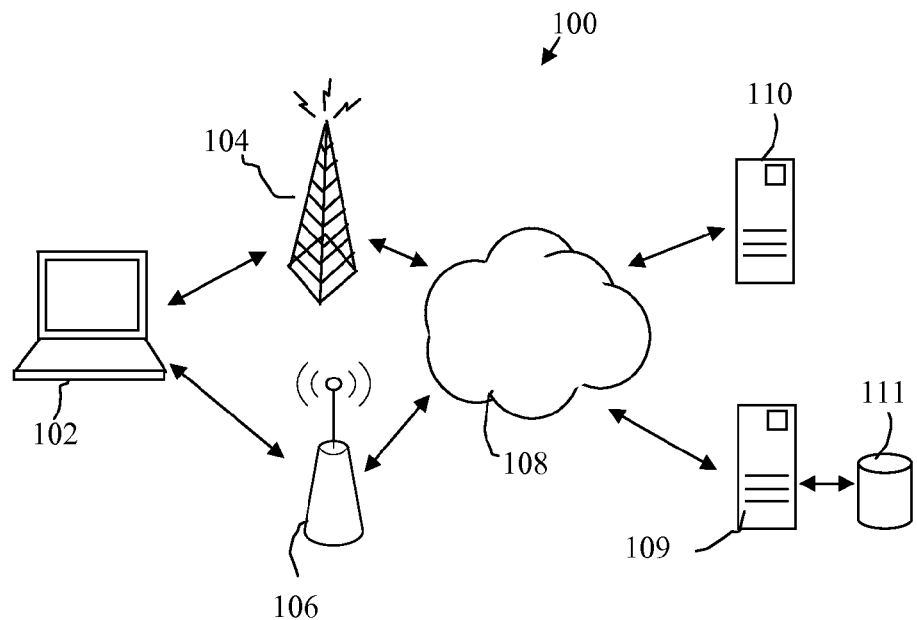
FIG. 1 is a block diagram of a network infrastructure.

For convenience, like numerals in the description refer to like structures in the drawings. Referring to FIG. 1, a diagram illustrating a network environment is illustrated generally by numeral 100. The network environment 100 comprises a mobile communication device 102, a first access point 104, a second access point 106, a network 108, a validation server 109, and a target server 110. The mobile communication device 102 can connect to the network 108 via one or both of the first network access point 104 or the second network access point 106 in order to communicate with the validation server 109 or web server 110.

In the present embodiment, the network 108 is a Wide Area Network (WAN) such as the Internet.

The mobile communication device 102 is a mobile device such as a portable computer, tablet computer, smartphone or a personal digital assistant (PDA). The communication device 102 is configured to be capable of communicating via the first access point 104 and the second access point 106. In the present embodiment, the communication device 102 further includes validation software for communication with the validation server 109 via the first access point 104.

The first access point 104 is a cellular base station for communicating over a cellular network. As is known in the art, the cellular base station 104 provides a data packet service such as GSM-based High Speed Packet Access (HSPA).

The second access point 106 is a Wi-Fi access point configured as a hotspot. Accordingly, the Wi-Fi access point 106 includes hotspot software that intercepts an initial request from the communication device 102 to access the Internet 108 via the Wi-Fi access point 106. The hotspot software requires that the communication device 102 submits validation credentials before providing it with access to the Internet 108. Accordingly, the Wi-Fi access point 106 can be viewed as a Local Area Network (LAN) that provides a gateway to the Internet 108.

The validation server 109 is a server configured to manage validation credentials for a plurality of different users for a plurality of different hotspots. The validation credentials are stored in a database 111. The amount and type of information may vary, depending on the implementation, as will be apparent to a person of ordinary skill in the art. Further, the validation server 109 and the database 111 are illustrated separately for ease of explanation only. The validation server 109 and the database 111 may be implemented on a single physical machine or by means of a distributed collection of servers and databases, as will be apparent to a person of ordinary skill in the art. Given the sensitive nature of the validation credentials, the validation server 109 and the database 111 will need to be secured appropriately, as will be apparent to a person of ordinary skill in the art.

The target server 110 is a remote computing device from which the mobile communication device 102 may request information and to which the mobile communication device 102 may transmit information via the Internet 108. The target server 110 may be a web server or may be any other device, such as a mail server, SIP server, and the like, connected to the Internet 108, with which the mobile device 102 wished to communicate.

Figure 2:
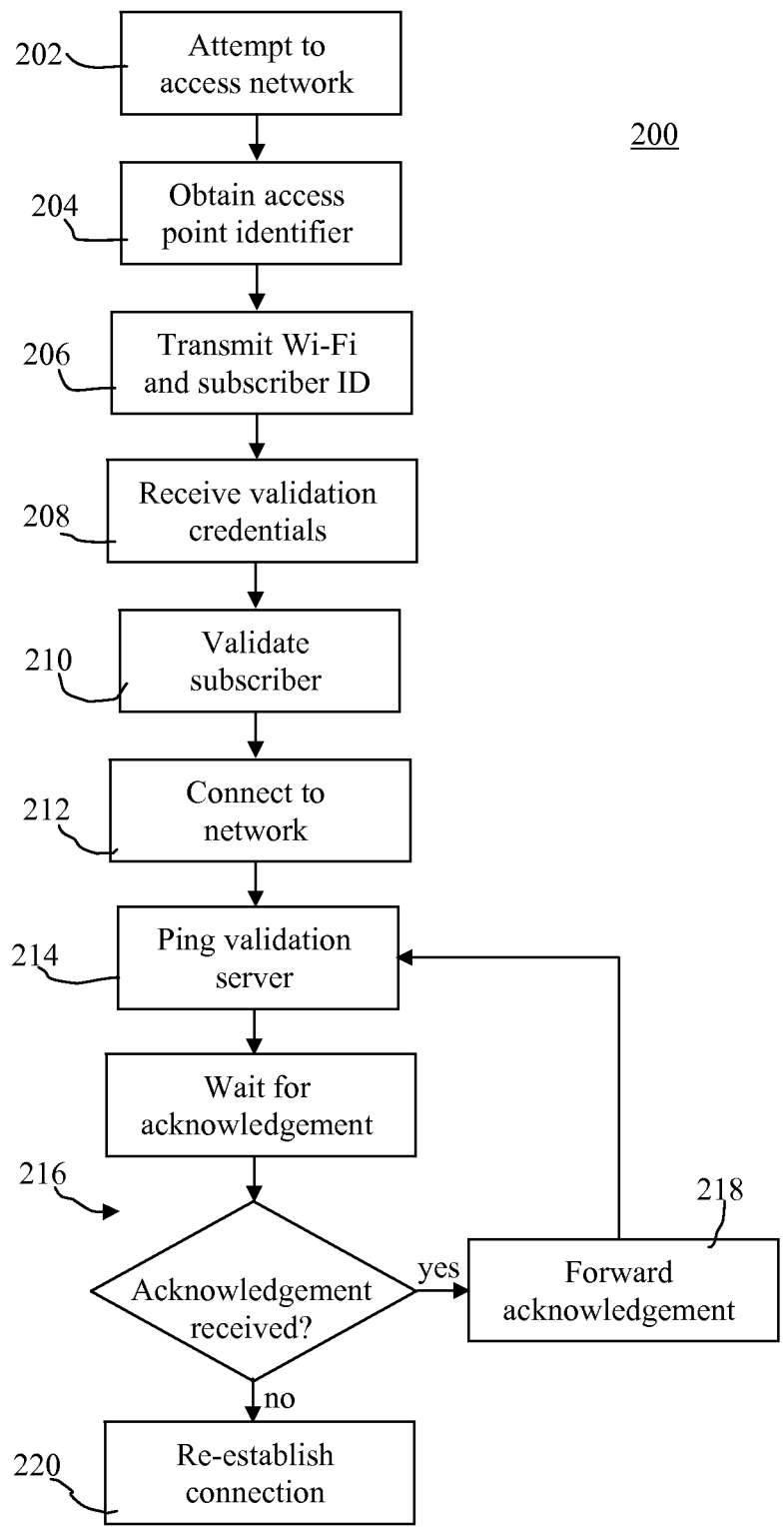
FIG. 2 is a flow chart illustrating operation of a mobile communication device.

Referring to FIG. 2 a flow chart showing the general operation of the communication device 102 is illustrated generally by numeral 200. At step 202, a subscriber attempts to use the communication device 102 to access the Internet 108 via the Wi-Fi access point 106 and is prompted by the hotspot software for validation credentials.

At step 204, the validation software obtains an access point identifier. In the present embodiment, the access point identifier is a Wi-Fi identifier (ID) of the Wi-Fi access point 106. The Wi-Fi ID can be any identifier that sufficiently identifies the Wi-Fi access point for obtaining user credentials. For example, it may be sufficient to obtain an identifier of the service provider managing the Wi-Fi hotspot. Alternatively, it may be necessary to obtain a Service Set Identifier (SSID), or other unique identifier, of the Wi-Fi access point 106 itself.

At step 206, the wireless communication device 102 transmits the Wi-Fi ID along with subscriber identification information to the validation server 109 using the first network access point 104. At step 208, the wireless communication device 102 receives the validation credentials from the validation server 109 via the first network access point 104.

At step 210, the validation software communicates the received validation credentials to hotspot software for validating the subscriber. The subscriber is validated and, at step 212 the communication device 102 is permitted by the Wi-Fi access point 106 to use the Wi-Fi access point 106 to connect to the Internet 108.

Optionally, the status of the connection to the Wi-Fi access point 106 may be monitored as follows. At step 214, once the subscriber has access to the Internet 108, the validation software "pings" the validation server 109 at various intervals via the Wi-Fi access point 106. This ping provides an update to the validation server 109 that the connection to the Wi-Fi access point 106 is being maintained.

At step 216, the wireless communication device 102 receives an acknowledgment message via the cellular network 104 in response to the ping sent at step 214. At step 218, the acknowledgment message is forwarded, via the Wi-Fi access point 106 verifying that the connection is still active. If the connection appears to be inactive, at step 220 a new connection can try to be re-established. Input from the subscriber to confirm that it is desirable to establish a new connection may be obtained at this point.

Figure 3:
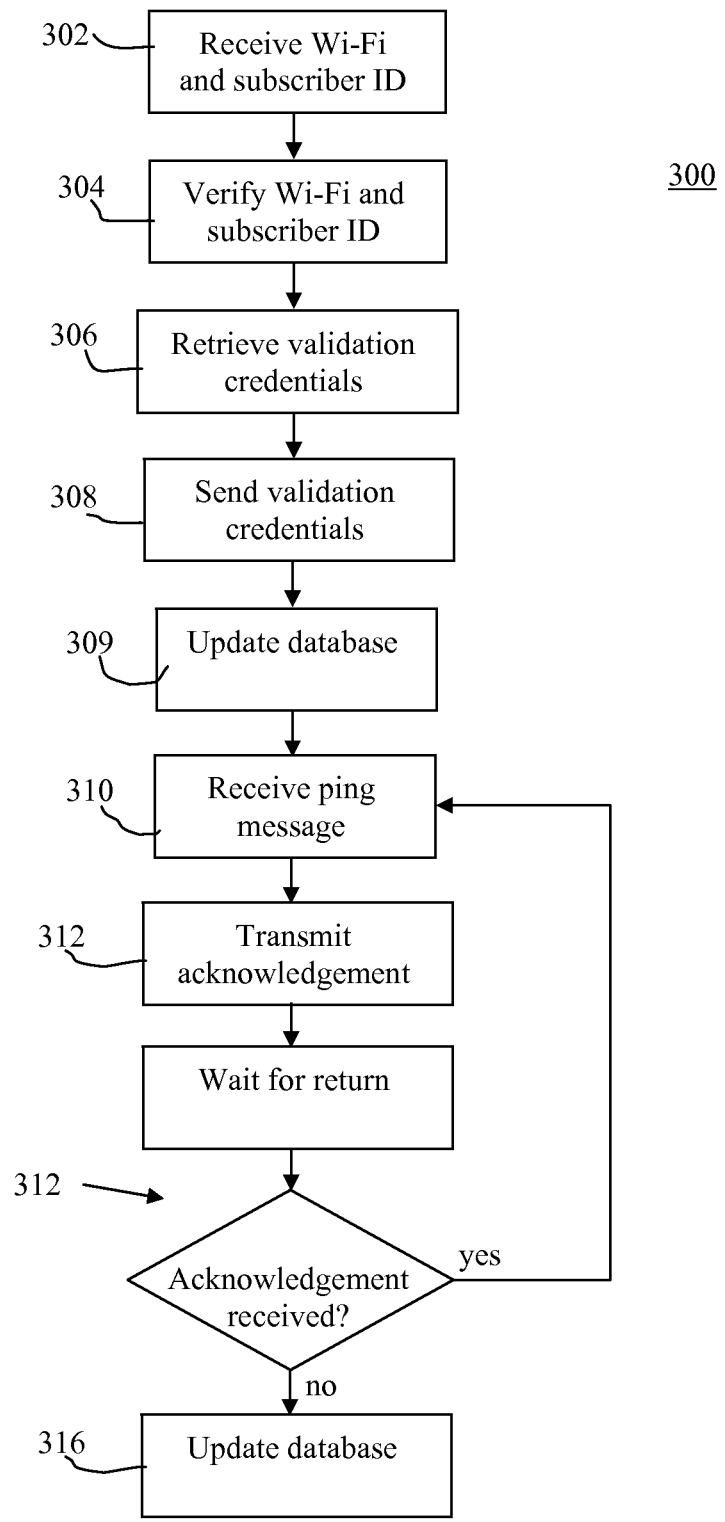
FIG. 3 is a flow chart illustrating operation of a validation server.

Referring to FIG. 3 a flow chart showing the general operation of the validation server 109 is illustrated generally by numeral 300. At step 302, the validation server 109 receives subscriber information and Wi-Fi ID from the wireless communication device 102. At step 304, the validation server 109 verifies the subscriber identification information and the Wi-Fi ID. Validation of subscriber identification is beyond scope of current invention and can be achieved using any known or propriety method in the art, with appropriate security to the task.

At step 306, the validation server 109 retrieves validation credentials from an account associated with the Wi-Fi ID and the subscriber identification. In the present embodiment, the validation information, subscriber identification and Wi-Fi ID are stored and correlated in the database 111, with appropriate security as is known to a person of ordinary skill in the art. At step 308, the validation information is transmitted securely to the wireless communication device 102. At step 309, the database is updated to indicate that the account is in use.

Optionally, the status of the connection to the Wi-Fi access point 106 may be monitored as follows. At step 310, a ping is received from the wireless communication device via the Wi-Fi access point 106. At step 312, the validation server 109 transmits an acknowledgment message via the cellular network 104 in response to the ping. At step 314, the acknowledgment message is received, via the Wi-Fi access point 106, verifying that the connection is still active. If the connection appears to be inactive, then at step 316 the database is updated accordingly.

It will be appreciated that the wireless communication device 102 uses the cellular network 104 to obtain the required validation credentials to access the Wi-Fi access point 106, thereby providing the communication device 102 with access to the Internet 108. By providing the validation software on the communication device 102, the subscriber is not required to manage validation credentials for multiple accounts. Further, the process of accessing the Wi-Fi access point 106 may be entirely transparent to the subscriber, thereby further securing the validation credentials. Yet further, management of multiple accounts can be maintained at a central location, the validation server 109, that has up-to-date information regarding the usage of each of a plurality of accounts.

The network infrastructure described above facilitates a number of different implementations. For example, in one embodiment, the network infrastructure may be used to manage a plurality of corporate hotspot accounts. A company, or any organization for that matter, may wish to maintain a plurality of hotspot accounts for their employees to access while away from the office. However, it is often unnecessary and, therefore, expensive to maintain an account for each user. Accordingly, only a few are set up to be shared between employees.

In this embodiment, each employee's subscriber identification is correlated with a group identifier. In the present embodiment this is accomplished by the validation software on the wireless communication device 102. That is, the validation software is configured with information identifying the group identifier and this information is transmitted as part of the subscriber identification information. Alternatively, the validation server 109 may be configured to correlate individual users with a group identifier and therefore, the group identifier need not be transmitted by the wireless communication device 102.

As part of retrieving the validation credentials at step 306, the validation server 109 retrieves one of a plurality of available accounts associated with the group identifier, verifies that the account is not currently in use, and then updates the database 111 to reflect that the account is in now in use.

If, however, all of the accounts for the group identifier are in use, then the validation server 109 returns a busy message to the wireless communication device 102. The validation software informs the subscriber, via a graphical user interface (GUI) on the wireless communication device 102, that all of the accounts are in use.

Alternatively, if all the accounts for the group identifier are in use, the validation server 109 dynamically creates a new account and correlates it with the group identifier. The validation server 109 then transmits the new validation credentials to the wireless communication device 102.

Thus it will be appreciated that the validation server can be used to manage a plurality of shared account while remaining transparent to the subscribers. This allows groups to easily share accounts between users without tracking which account each group member is using.

In an alternate embodiment, the network infrastructure 100 may be used to provide the subscriber with a single account, operated by a general hotspot service, that is capable of accessing a plurality of hotspots operated by different service providers. The general hotspot service itself may or may not provide and manage its own Wi-Fi access points 106. However, the general hotspot service would maintain at least a plurality of accounts with a plurality of different service providers. In the present embodiment, the validation server 109 is managed by the general hotspot service. Alternatively, the general hotspot service is managed on a validation server 109 that hosts a plurality of general hotspot services.

As part of verifying the subscriber identification information and the Wi-Fi ID at step 304, the validation server 109 determines the service provider for the Wi-Fi access point 106 identified by the Wi-Fi ID. The validation server 109 further determines whether or not the service provider is supported by the general hotspot service. That is, does the general hotspot service have accounts registered with the determined service provider. Optionally, the validation server determines whether the subscriber has subscribed to a level of service that permits access to the determined service provider.

If the subscriber identification information and the Wi-Fi ID are verified then, as part of retrieving the validation credentials at step 306, the validation server 109 retrieves one of a plurality of available accounts associated with the determined service provider. Further, the validation server 109 verifies that the account is not currently in use and then updates the database 111 to reflect that the account is now in use.

If, however, if all the accounts for the determined service provider are in use, the validation server 109 dynamically creates a new account with the determined service provider. The validation server 109 transmits the new validation credentials to the wireless communication device 102.

Alternatively, if all of the accounts for the determined service provider are in use, then the validation server 109 returns a busy message to the wireless communication device 102. The validation software informs the subscriber, via a GUI on the wireless communication device 102, that all of the accounts are in use.

Figure 4:
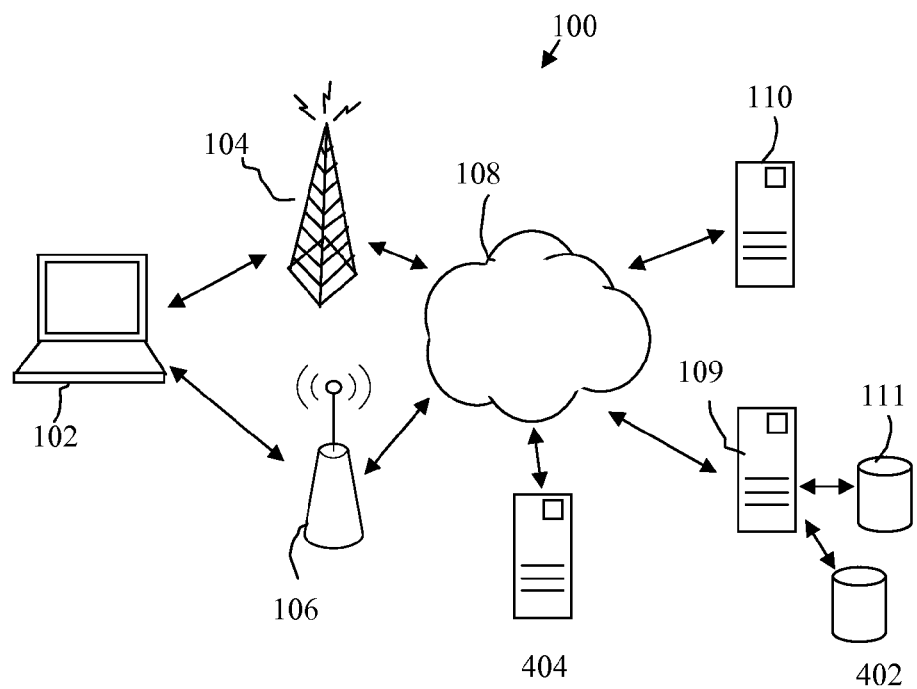
FIG. 4 is a block diagram of an alternative network infrastructure.

In yet an alternate embodiment, the network infrastructure 100 may be used to provide "pay-as-you-go" service for Wi-Fi access points 106. Such Wi-Fi access points 106 may include Wi-Fi access points 106 that traditionally provide hotspots, and may include less traditional sources of hotspots, such as small businesses or residences. Referring to FIG. 4, in the present embodiment, the validation server 109 further includes an accounting module 402. The accounting module 402 is configured to track the amount of time during which the subscriber is connected to the Wi-Fi access point 106. The connection duration, along with a predefined access rate established by the Wi-Fi access point 106, is used to determine the cost of the connection.

In the present embodiment, the accounting module 402 interfaces with one or more standard payment modules 404, such as Paypal, Google Checkout, or any online credit card authorization module, as are known in the art. The payment module 404 interfaces with the wireless communication device 102, via either the Wi-Fi access point 106 or the cellular access point 104, in order to present the subscriber with a GUI to obtain the payment information and provide a summary of the total costs. In the present embodiment, the payment information is obtained before the validation server 109 transmits any validation credentials.

Accordingly, the present embodiment provides a relatively inexpensive way for small businesses and residences to leverage their own Wi-Fi access points 106 in order to generate revenue.

In the embodiments described above, the cellular base station 104 is used primarily to obtain the validation credentials, while a bulk of the subsequent communication with the network is transmitted via the Wi-Fi access point 106. In an alternative embodiment, once the connection to the Wi-Fi access point has been established, both the Wi-Fi access point 106 and the cellular base station 104 can be used to transmit data, thereby increasing the bandwidth available to the device. The details of transmitting data using both the Wi-Fi access point 106 and the cellular base station 104 are beyond the scope of the present application and are described in co-pending U.S. Publication No. 20100154044.

As described above, the wireless communication device 102 is configured to communicate using both the first access point 104 and the second access point 106. This can be achieved using a number of different configuration. In a first configuration, the wireless communication device 102 has the radios necessary for accomplishing this task built into the device.

Alternatively, the wireless communication device 102 only has a built in radio for the second access point 106. A portable radio for communicating with the first access point 104, such as a cellular data stick or cellular telephone with a data plan, is connected to the wireless communication device 102 via a hardware port, such as a Universal Serial Bus (USB) port, or short range radio, such as Bluetooth™.

Alternatively, the wireless communication device 102 only has a built in radio for the first access point 104. A portable radio for communicating with the second access point 106, such as a Wi-Fi data stick, is connected to the wireless communication device 102 via a hardware port, such as a USB port, or short range radio, such as Bluetooth™.

Generally speaking, a wireless communication device 102 comprising only a radio for one of the first or second access points 104 and 106 may be paired, either wirelessly or by wire, to another device that provides a radio for the other of the first or second access points 104 and 106.

Further, although cellular access point 104 is described as being a 3G GSM network, it will be appreciated that it may be mobitex, 2G, CDMA-based EV-DO, LTE, and the like. As will be appreciated by a person of ordinary skill in the art, the type of technology used for the cellular network will likely evolve in the future and such technology may also be used.

Further, although the previous embodiments describe the Wi-Fi access point 106 primarily as a gateway to the Internet, the Wi-Fi access point may also provide access to a local area network (LAN). For example, if a company often sends it employees to client sites, the employees may need to access the client networks. In such an example, the client can assign the company with one or more accounts and their corresponding validation credentials in order to access their networks. This information can be stored by the validation server 109 and used to validate the employee when the employee attempts to access the client network. As previously discussed, such an implementation provides an added security benefit since the employee never needs to know the validation credentials.

Yet further, because the account validation occurs at the validation server 109, it is possible to dynamically create accounts and refresh passwords at predetermined or random intervals. Refreshing the password can help limit the subscriber using an account continuously.

Yet further, although the embodiment described above specifies that the wireless communication device 102 transmits subscriber identification information along with the Wi-Fi ID, it may be possible for the validation server 109 to identify without the wireless communication device 102 explicitly transmitting such information. For example, it may be possible for the cellular network to identify the wireless communication device and transmit the required information to the validation server 109.

Using the foregoing specification, the invention may be implemented as a machine, process or article of manufacture by using standard programming and/or engineering techniques to produce programming software, firmware, hardware or any combination thereof.

Any resulting program(s), having computer-readable instructions, may be stored within one or more computer-usable media such as memory devices or transmitting devices, thereby making a computer program product or article of manufacture according to the invention. As such, the terms "software" and "application" as used herein are intended to encompass a computer program existent as instructions on any computer-readable medium such as on any memory device or in any transmitting device, that are to be executed by a processor.

Examples of memory devices include, hard disk drives, diskettes, optical disks, magnetic tape, semiconductor memories such as FLASH, RAM, ROM, PROMS, and the like. Examples of networks include, but are not limited to, the Internet, intranets, telephone/modem-based network communication, hard-wired/cabled communication network, cellular communication, radio wave communication, satellite communication, and other stationary or mobile network systems/communication links. The client device 102 does not need to be mobile and the first and second access points 104 and 106 do not need to provide a wireless connection to the network.

A machine embodying the invention may involve one or more processing systems including, for example, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

Using the description provided herein, those skilled in the art will be readily able to combine software created as described with appropriate general purpose or special purpose computer hardware to create a computer system and/or computer subcomponents embodying the invention, and to create a computer system and/or computer subcomponents for carrying out the method of the invention.

Although preferred embodiments of the invention have been described herein, it will be understood by those skilled in the art that variations and combinations may be made thereto without departing from the scope of the appended claims.

What is claimed is:

1. A wireless communication device configured to be able to communicate via both a first access point and a second access point for using the first access point to obtain validation credentials in order to permit use of the second access point to access a network, the second access point configured to validate users attempting to access the network, the wireless communication device comprising:
 a processor; and
 a non-transitory computer readable medium having stored thereon computer executable instructions for execution by the processor, the computer executable instructions when executed by the processor cause the wireless device to:
  initiate communication with the second access point in order to access a network;

obtain an access point identifier from the second access point, the access point identifier for identifying the second access point;

transmit the access point identifier to a validation server via the first access point;

receive validation credentials from the validation server via the first access point, the validation credentials configured to access an account associated with the second access point and not associated with the first access point; and transmit the validation credentials to the second access point to validate the account with the second access point to obtain access to the network.

2. The wireless communication device of claim 1 comprising further computer executable instructions which, when executed by the processor, cause the wireless device to transmit subscriber identification information along with the access point identifier.

3. The wireless communication device of claim 1 comprising further computer executable instructions which, when executed by the processor, cause the wireless device to transmit a group identifier along with the access-point identifier, the group identifier identifying a group to which a plurality of accounts for accessing the second access point are established.

4. The wireless communication device of claim 1 comprising further computer executable instructions for monitoring the connection to the second access point, the computer executable instructions which, when executed by the processor, cause the wireless device to:

transmit a ping message to the validation server via the second access point;

receive an acknowledgement message from the validation server via the first access point; and transmitting the acknowledgement message to the validation server via the second access point.

5. The wireless communication device of claim 1 comprising further computer executable instructions which, when executed by the processor, cause the wireless device to transmit data via both the first access point and the second access point once access to the second access point has been obtained.

6. The wireless communication device of claim 1 wherein the first access point is a cellular base station and the second access point is a Wi-Fi access point.

7. A validation server configured to provide validation credentials to a mobile communication device configured to be able to communicate with a network via both a first access point and a second access point configured to validate users attempting to access the network, the validation server comprising:

a processor; and
a non-transitory computer readable medium having stored thereon:

validation credentials corresponding to one or more accounts associated with the second access point; and computer executable instructions for execution by the processor, the computer executable instructions when executed by the processor cause the validation server to:

receive a request from the mobile communication device via the first access point, the request including an access-point identifier for identifying the second access point and subscriber information for identifying a subscriber;

retrieve validation credentials for an account associated with the access-point identifier and not associated with the first access point from a database, the validation credentials configured to access the account;

transmit the validation credentials to the wireless communication device via the first access point for use by the mobile communication device for connecting to the network via the second access point.

8. The validation server of claim 7 wherein the validation credentials are associated with the access-point identifier.

9. The validation server of claim 7 wherein the validation credentials are associated with the subscriber information.

10. The validation server of claim 7 comprising further computer executable instructions which, when executed by the processor, cause the validation server to update the database once the validation credentials have been retrieved in order to indicate that the validation credentials are in use.

11. The validation server of claim 7 comprising further computer executable instructions which, when executed by the processor, cause the validation server to verify the subscriber information.

12. The validation server of claim 7 comprising further computer executable instructions which, when executed by the processor, cause the validation server to receive a ping message from the mobile communication device via the second access point;

transmit an acknowledgement message to the mobile communication device via the first access point; and receive the acknowledgement message from the mobile communication device via the second access point.

13. The validation server of claim 7 comprising further computer executable instructions which, when executed by the processor, cause the validation server to obtain a group identifier, the group identifier identifying a group to which a plurality of accounts for accessing the second access point are established.

14. The validation server of claim 13, wherein the group identifier is the subscriber information.

15. The validation server of claim 13, wherein the group identifier is received in addition to the subscriber information.

16. The validation server of claim 13 comprising further computer executable instructions which, when executed by the processor, cause the validation to determine the group identifier based on the subscriber information.

17. The validation server of claim 13 wherein the computer executable instructions operable to retrieve the validation credentials from the database comprise instructions which, when executed by the processor, cause the validation server to:

identify a plurality of accounts associated with the group identifier, each account having corresponding validation credentials;

determine an available account from the plurality of accounts, and retrieve the validation credentials for the available account.

18. The validation server of claim 13 comprising further computer executable instructions which, when executed by the processor, cause the validation server to establish a new account associated with the second access point.

19. The validation server of claim 7 comprising further computer executable instructions which, when executed by the processor, cause the validation server to:

communicate with an accounting module to monitor a duration of a connection between the mobile communication device and the second access point; and interface with a payment module to obtain payment for the mobile communication device accessing the second access point based on the duration of the connection.

20. The validation server of claim 7 wherein the first access point is a cellular base station and the second access point is a Wi-Fi access point.

21. A non-transitory computer readable medium having stored thereon computer executable instructions for providing validation credentials to a mobile communication device configured to communicate with a network via a first access point and a second access point configured to validate users attempting to access the network, the computer executable instructions when executed by a processor cause the processor to:

store validation credentials corresponding to one or more accounts associated with the second access point and not associated with the first access point, the validation credentials configured to access the one or more accounts;

receive a request from the mobile communication device via the first access point, the request including an access-point identifier for identifying the second access point and subscriber information for identifying a subscriber;

retrieve validation credentials for an account associated with the access-point identifier from a database and;

transmit the validation credentials to the wireless communication device via the first access point for use by the mobile communication device for connecting to the network via the second access point.

\* \* \* \* \*